Sept. 10, 1968  J. E. FAVORS ET AL  3,400,735
PRESSURE REGULATING RELEASE VALVE
Filed Aug. 30, 1966  2 Sheets-Sheet 2
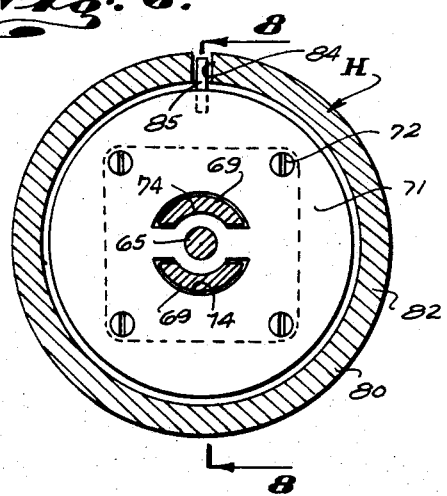
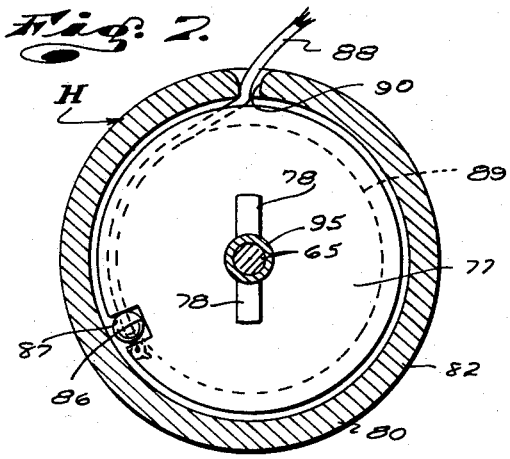
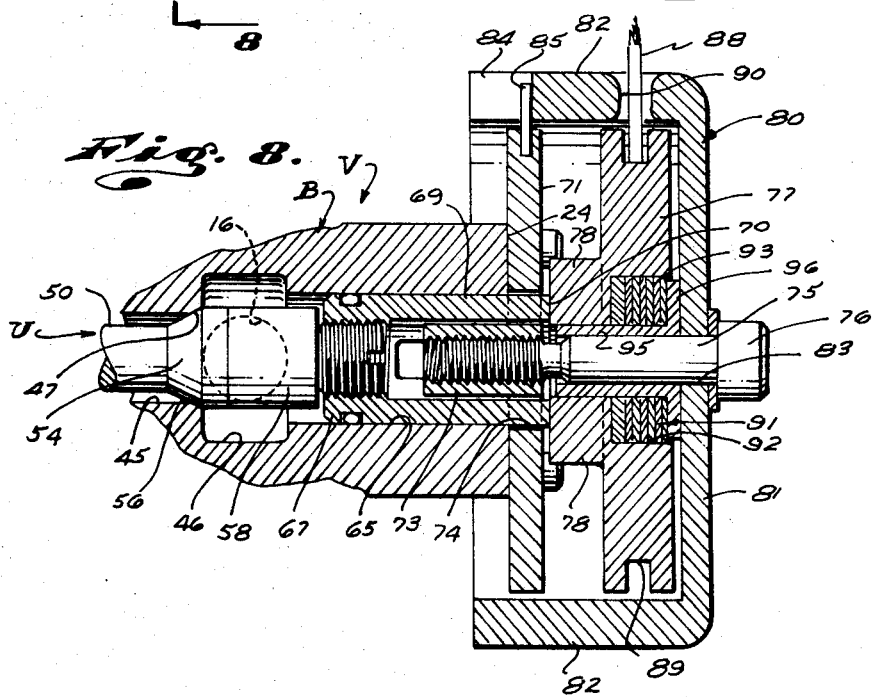
Inventors
Jack E. Favors
Gerald A. Morales
Donald D. Champion
By
Attorney

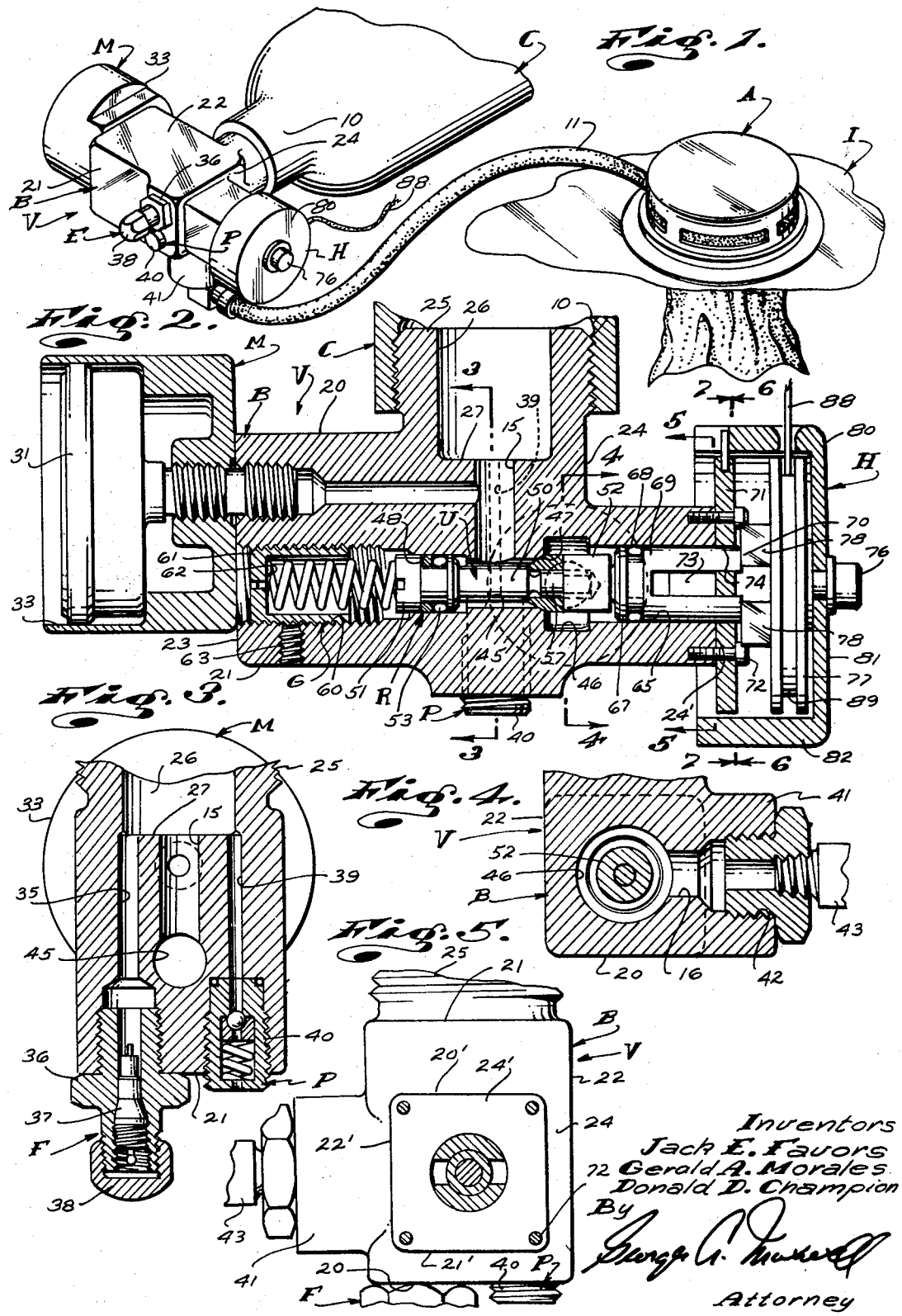

United States Patent Office 3,400,735
Patented Sept. 10, 1968

3,400,735
PRESSURE REGULATING RELEASE VALVE
Jack E. Favors, Lakeview Terrace, Gerald A. Morales, Simi, and Donald D. Champion, La Puente, Calif., assignors, by mesne assignments, to Rocket Jet Engineering Corp., Glendale, Calif., a corporation of Delaware
Filed Aug. 30, 1966, Ser. No. 576,071
10 Claims. (Cl. 137—557)

ABSTRACT OF THE DISCLOSURE

A valve structure including, an elongate body with front and rear ends, an elongate longitudinal flow passage with a forwardly disposed annular valve seat at its forward end in the body, an enlarged flow chamber communicating with the forward end of the flow passage and the seat, a plunger bore entering the front end of the body and communicating with the flow chamber, a socket entering the rear end of the body, a piston bore between and communicating with the socket and the flow passage, an inlet port in the body communicating with the rear portion of the flow passage and an outlet port in the body communicating with the flow chamber, an elongate valving unit including an elongate coupler extending longitudinally through the flow passage, a valve member on the front end of the coupler in the flow chamber and normally engaging the valve seat, a piston head on the rear end of the coupler and engaged in the piston bore, a plunger slidably engaged in the plunger bore, manually operable release means normally releasably holding the plunger in engagement with the front end of the valve member and holding said member seated on the valve seat and actuating means in the socket normally yieldingly urging the unit forwardly.

---

Throughout the many parts there are a great number of situations where various mechanisms and/or devices are operated by bottled gas under pressure and where the pressure of the gas, at that point where its work energy is utilized, must be kept or maintained substantially constant.

In such situations, a delivery line is connected between the gas supply and the mechanism to be operated, a manually operated release valve is arranged in the line to selectively initiate the flow of air and, since the pressure of the gas drops as the supply is drained and is subject to wide variations, a pressure regulator is provided in the line downstream of the valve.

Typical of such set-ups are the inflation systems for inflatable passenger escape chutes for aircraft.

The inflation systems for such escape chutes are self-contained unitized systems and include a cylinder of compressed air, an aspirator related to an inlet end of the chute structure, a delivery line extending from the cylinder to the aspirator, a manually operable release valve and a pressure regulator in the line.

An object of this invention is to provide a novel pressure regulating release valve which is small, light, neat and compact, whereby its weight is a fraction of the weight of, and takes up a fraction of the space of, conventional apparatus and systems presently built up of separate valves and pressure regulators to gain like end results.

Another object of this invention is to provide a structure of the character referred to in which the valving means and pressure regulating means are structurally inter-related whereby the construction requires a minimum number of parts.

Yet another object of the invention is to provide a structure of the character referred to wherein each of the several parts is simple in design and easy to manufacture and assemble, and a structure which is therefore easy and economical to manufacture, service, and maintain.

Still another object of the present invention is to provide a structure of the character referred to which is highly effective and dependable in operation.

The above and other objects and features of this invention will be fully understood from the following detailed description of a typical preferred form and application of the invention, throughout which description reference is made to the accompanying drawings, in which:

FIG. 1 is an isometric view of the new construction showing it related to a compressed air cylinder and an aspirator on an inflatable structure;

FIG. 2 is an enlarged detailed sectional view taken as indicated by line 2—2 on FIG. 1;

FIG. 3 is a sectional view taken as indicated by line 3—3 on FIG. 2;

FIG. 4 is a sectional view taken as indicated by line 4—4 on FIG. 2;

FIG. 5 is a view taken as indicated by line 5—5 on FIG. 2;

FIG. 6 is a sectional view taken as indicated by line 6—6 on FIG. 2;

FIG. 7 is a sectional view taken as indicated by line 7—7 on FIG. 2; and,

FIG. 8 is an enlarged detailed sectional view taken substantially as indicated by line 8—8 on FIG. 6.

The pressure regulating release valve construction V provided is adapted to control the flow of compressed air from a flask or cylinder C to an aspirator A at the inlet end of an inflatable structure I.

The construction V, as shown in FIG. 1 in the drawings, is connected directly with the neck portion 10 of the cylinder C and is connected with the aspirator A by means of a flexible flow line 11.

The aspirator A can be of any suitable design. Accordingly, we have chosen to illustrate the aspirator A in elevation only and will not burden this application with further detailed description and disclosure thereof.

The inflatable structure I with which the aspirator A is related can be of any desired construction. As indicated, it might be in the nature of an elongate, tubular, plastic structure, which, when inflated, establishes an aircraft escape chute down which persons within the aircraft can slide. Since the exact form of the inflatable structure I can vary widely and does not affect the novelty of this invention, further illustration and description thereof will be dispensed with.

The valve structure V includes an elongate, unitary body B having inlet and outlet ports 15 and 16, pressure indicating means M related to the inlet port and carried by the body, filler means F, pressure relief means P and flow control and pressure regulating means R within the body and related to the ports 15 and 16.

Referring to FIG. 2 of the drawings, the body B is an elongate structure having a primary, left-hand portion with flat, top, bottom and side surfaces 20, 21 and 22, and a flat, axially disposed rear end surface 23 and a flat front end surface 24. The body further includes a secondary portion of smaller cross-section than the primary portion and extending longitudinally outwardly and forwardly from the front end surface 24 of the primary portion. The secondary portion, like the primary portion, has flat, top, bottom and side surfaces 20', 21' and 22' and a flat, axially disposed front surface 24'.

The primary portion of the body has an upwardly projecting externally threaded cylindrical neck 25 which is threadedly engaged in the neck 10 of the cylinder C and through which the inlet port 15 extends.

In the case illustrated, the neck 25 has an enlarged bore or socket 26 entering its upper end and terminating at a flat bottom 27. The port 15 is concentric with the socket in the neck and extends downwardly into the body from the bottom 27 thereof to terminate in the lower portion of the body, as will hereinafter be described.

The pressure indicating means M that is provided by the present invention includes a longitudinally extending passage 30 in the upper portion of the primary portion of the body and extends between the inlet port 15 and the rear surface 23 of the body, a pressure gauge 31 of conventional construction and design arranged adjacent said surface 23 and having a stem threadedly engaged in the rear or outer end of the passage 30.

In the case illustrated, a longitudinally outwardly and rearwardly disposed cup-like housing 33 is arranged about the periphery of the gauge 31 and between the gauge and the body to suitably protect the gauge.

With the means M set forth above, it will be apparent that the pressure of the stored compressed air in the cylinder C and communicating with the inlet port 15 of the valve structure can be readily checked and determined at any time.

The filler means F (see FIG. 3) includes an elongate vertical passage 35 extending from the bottom 27 of the socket 26 in the neck 25, through the body to the bottom surface 21 thereof, a valve carrier 36 threadedly engaged in the lower end of the passage 35 and a conventional air check valve structure 37 carried by said carrier and accessible at the bottom of the construction. In practice, the valve construction 37 can be of any suitable design and is preferably that type of valve which is commonly employed in connection with inner tubes for pneumatic tires, high pressure gas cylinders and the like.

The means F, as illustrated, is laterally offset toward one side of the body and communicates with the socket 26 at one side thereof.

The carrier 36 is shown provided with a suitable protective cap 38.

The pressure relief means P includes an elongate vertical passage 39 extending from the bottom 27 of the socket 26, through the body to the bottom surface 21 thereof and a conventional spring loaded ball type pressure relief valve structure 40 having a cylindrical, externally threaded body threadedly engaged in the lower end of the passage 39. The valve 40 is pre-set to open at the predetermined maximum pressure for which the cylinder and valve structure V is designed.

The valve structure 40, like the check valve construction 37, can be of any suitable and desired construction.

With the means P, it will be apparent that should the system become over pressurized, as by overcharging it or as a result of subjecting the cylinder to excessive heat, the excess pressure will be bled off through the valve 40, without damage to the apparatus.

The passage 39, like the passage 35 is laterally offset to one side of the body and communicates with the socket 26 at one side thereof. In practice and as illustrated the passage 39 occurs at the opposite side of the socket from the passage 35.

The outlet port 16 is in the lower forward portion of the primary portion of the body and extends transversely or laterally from one side thereof into the body to terminate in the central portion thereof, forward of the inner lower end of the inlet port 15. In practice, the body is provided with a laterally outwardly projecting boss 41 on that side of the body the outlet port 16 enters, concentric with said inlet port and which is provided with a threaded socket 42, communicating with the port 16 and into which a suitable fitting 43 on the adjacent end of the flow line 11 is threadedly engaged.

The flow control and pressure regulator means R provided includes a central, longitudinally extending flow passage 45 in the body, extending freely between the passages 35 and 39 (and adjacent the lower inner ends of and communicating with the inlet port 15), an enlarged flow chamber 46 at the forward end of the passage 45 and communicating with the inner end of the outlet port 16, an annular valve seat 47 at the forward end of the flow passage 45 and the rear wall of the chamber, an enlarged piston bore 48 concentric with and continuing longitudinally rearwardly in the body from the rear end of the flow passage 45 and an elongate combination piston and valve unit U engaged in and extending through the bore 48, passage 45 and chamber 46.

In addition to the above, the means R includes actuating means G and manually operable release means H.

The combination piston and valve unit U includes an elongate cylindrical stem or coupler 50 concentric with and extending longitudinally through the flow passage 45, an enlarged piston head 51 on the rear end of the coupler and slidably engaged in the bore 48 and an enlarged valve member 52 on the front end of the coupler, within the chamber 46 and engageable on and with the seat 47.

The coupler 50 is considerably smaller in diameter than the flow passage and projects freely therethrough with considerable clearance.

The piston head 51 is a simple, enlarged, cylindrical part formed integrally on and with the rear end of the coupler 50 and is provided with an annular radially outwardly opening groove in which suitable sealing means 53 are arranged and carried to seal with and between the piston and bore 48. The sealing means 53 can include an O-ring and a suitable back-up ring, as illustrated, or any other suitable form of seal.

The valve member 52 is fundamentally an enlargement at the rear end of the coupler having a radially inwardly and rearwardly inclined sealing surface 54 to engage and seal on and with the seat 47 and defines a flat, axially forwardly disposed front surface 55.

In the preferred carrying out of the invention, the valve member 52 is an assembly comprising an annular plastic sealing ring 56 defining the surface 54 and slidably engaged on and about a forward projecting reduced extension 57 on the coupler to seat against the front end of said coupler and a cylindrical retainer 58 defining the front surface 55, threadedly engaged on the extension 57 forward of the ring 56.

The flow passage 45, the chamber 46, bore 48, coupler 50, piston 51 and valve member or assembly 52 are of such relative longitudinal extent that when the valve member is seated and in its rear or closed position, the piston is in the rear portion of the cylindrical bore and when the valve member is shifted forwardly to a fully open position, the coupler and the piston shift forwardly to a position where the piston shifts into close proximity to or stops against a rearwardly disposed annular shoulder defined by the rear end of the flow passage and the forward end of the enlarged bore.

With the structure thus far described, it will be apparent that when the unit U is in its rear position, the valve member is seated on the seat 47, flow of air from the cylinder C, through the port 15 and flow passage 45, into the chamber 46 and thence out through the port 16, is prevented, and that when said assembly is shifted forwardly to unseat the valve member, such flow is permitted. The effective cross-sectional area of the piston is greater than the effective cross-sectional area of the valve member when the structure is in its closed position, with the result that the air pressure in the flow passage acting upon the piston and valve member normally holds the valve member closed.

When the construction is in its open position, and the entire cross-sectional extent of the sealing surface 54 of the valve member 52 is exposed, to the pressure of the air in the flow passage, the effective cross-sectional areas of the piston and the valve member are, with respect to the air in the flow passage, equal or balanced and the unit is in no way affected by said pressure.

It is to be noted that when the unit is in its open position, and air is free to flow into the chamber, the entire cross-sectional area of the valve member defined by the front surface 55 of the valve member is exposed to the pressure of the air in the chamber 46 with the result that the pressure in the chamber acts upon and urges the unit U rearwardly and towards its closed position. This noted action, if left unchecked, would result in the unit U being urged rearwardly and towards its closed position to such an extent that flow through the construction would not be uniform and would be unduly restricted.

The actuating means G that we provide includes an enlarged, internally threaded socket 60 entering the rear end of the body concentric and communicating with the rear end of the piston bore 48, a forwardly opening cup 61 threadedly engaged in the socket 60 and a compression spring 62 seated in the cup and projecting forwardly therefrom to engage and seat on the rear end of the piston 51.

The spring 62 normally yieldingly urges the unit U forwardly from its closed to its open position and normally yieldingly holds the unit in said open position and against the action of the pressurized acting upon the end surface 55 of the valve member.

By advancing the cup 61 longitudinally forwardly or rearwardly so as to increase or decrease the extent to which the spring 62 is biased, the action of the spring upon the unit U can be varied and controlled so that the pressure in the chamber 46 is maintained at a predetermined pressure. That is, so that when the pressure in the chamber 46, acting upon the valve member, increases beyond a predetermined pressure, the valve member is urged rearwardly against the resistance of the spring and towards its closed position, thereby restricting the flow of air into the chamber and so that when the pressure in the chamber and acting upon the valve member drops below a predetermined pressure, the spring urges the valve member open to an extent necessary to increase the pressure in the chamber to that which is desired.

In practice, the cup 61 is provided with a screw driver slot in its rear end to effect adjustment and is provided with a bleed port (entering the bottom of the slot) to prevent the trapping of air in the construction which might buffer and prevent the free action of the construction.

Further, the body carries suitable means to lock the cup in set position. Such means can, as illustrated, include a simple set screw 63.

The manually operable release means that we provide and identified by the Character H in the drawings includes an elongate, axially extending bore 65 entering the secondary portion of the body at the front end surface 24' thereof. The bore 65 is in axial alignment with the flow passage and chamber 46 and communicates with the said chamber.

The means H further includes an axially shiftable plunger 67 slidably engaged in the bore 65 to normally engage the forward end 55 of the valve member 52 to hold the valve member in its rear or closed position. The plunger 67 is an elongate cylindrical member and is provided with suitable sealing means 68 about its rear portion to seal between the bore 65 and the plunger and is provided with two circumferentially spaced, axially forwardly disposed front ends 70. The legs 69 project freely forwardly through the bore 65 and from the forward end of the body.

The means H further includes a substantially disc-shaped carrier plate 71 fixed to the front end surface 24' of the secondary portion of the body by means of suitable screw fasteners 72.

The plate 71 has a rearwardly projecting internally threaded cylindrical sleeve 73 formed integrally therewith and projecting freely rearwardly into the bore 65 and between the legs 69 on the plunger 67 and a pair of axially extending, circumferentially spaced apertures 74, radially outward of the sleeve and through which the forward end protions of the legs 69 on the plunger freely project.

In addition to the foregoing, the means H includes a central, axially extending, shaft 75 threaded into the sleeve 73 to project forwardly therefrom. The shaft 75 is provided with an enlarged head 76 with a suitable tool engaging slot therein at its forward terminal end.

A disc shaped latch wheel 77 is rotatably carried by the shaft and is provided with and carries a pair of circumferentially spaced, radially extending, axially rearwardly projecting bar-like stop lugs 78, which lugs have rearwardly disposed radially extending edges to normally engage the forward ends of the legs 69 of the plunger 67 to stop the plunger and prevent rearward shifting thereof. The wheel is adapted to be rotated to shift the lugs circumferentially out of engagement with the legs and to thereby permit the free forward shifting of the plunger relative to the plate and the body whereby the unit U with the valve member 52 is free to be shifted forwardly by action of the spring 62.

A rearwardly opening cup-like housing 80 is provided about the wheel and carrier plate and is shown as having a front wall 81 spaced forward of the wheel and an annular, rearwardly projecting side wall 82 freely surrounding the plate and the wheel. The front wall 81 occurs between the wheel 77 and the head 76 on the shaft and is provided with a central opening 83 through which the shaft extends.

The rear edge of the side wall 82 is provided with a notch 84 in which a stop pin 85, carried by and projecting radially outwardly from the plate 71, is engaged. It will be apparent that the pin 85 holds the housing 80 against rotation and stationary relative to the housing and carrier plate.

The wheel 77 is provided with a radially outwardly opening notch 86 to cooperatively receive and retain a knot or enlargement, such as a retainer ball 87 on the inner end of an elongate, manually engageable lanyard 88 and is provided with a circumferentially extending, radially outwardly opening groove 89 communicating with the notch and adapted to freely receive and guide the end portion of the lanyard adjacent the enlargement or ball. The housing 80 is provided with a radially outwardly opening guide opening 90 in one side thereof and in the same radial plane as the groove in the wheel and through which the lanyard 88 is threadedly engaged for access at the exterior of the construction.

The stop lugs 78 on the wheel 77 are normally set ninety degrees from that position where they are free to enter between the legs 69 on the plunger, so that upon turning the wheel ninety degrees as by engaging and pulling the lanyard 88, effects release of the means H. Accordingly, the notch 86 in the wheel is normally spaced in excess of ninety degrees from the opening 90 in the housing.

Finally, the means H is provided with or includes biasing means 91 at and between the forward end of the wheel 77 and the head 76 and the related front wall 81 of the housing 80. The means 91 is provided to take up necessary slack and/or running play between the several parts of the construction and to normally yieldingly urge the wheel 77, with the stop lugs 78, rearwardly with sufficient force to prevent the spring 62 from urging the unit U forwardly in such a manner as to unseat the valve and yet without such force as might cause binding of the construction and prevent its free and dependable operation.

The means 91 in the form of the invention illustrated includes a forwardly opening socket 92 in the center of the wheel 77, about the shaft and spring means in the socket acting axially between the bottom thereof and the head on the shaft, through the front wall of the housing, to urge the wheel rearwardly. The spring means is shown as a plurality of resilient, axially yieldable washers 93. The washers employed can be that type or kind of axially yieldable washer sold under the trade-name "Belleville."

A suitable elongate, axially extending bearing sleeve 95 with a radially outwardly projecting retaining flange 96 at its forward end is provided between the wheel and the shaft, with the flange 96 projecting radially outwardly between the washers and the front wall of the housing, is provided to assure free rotation of the wheel and free action of the biasing means 91.

In practice, the rear end of the sleeve 95 opposes the front surface of the plate 71, and the center thereof and is adapted to stop thereon to limit compression of the washers of spring means 93 and to thereby prevent them from being over biased.

In operation, the valving and pressure regulating structure V related to a cylinder of compressed air C, or other suitable air supply, and an aspirator or like device, in the manner illustrated in FIG. 1, is set in its normal or closed position. When thus related and set, the supply or charge of air in the cylinder C can be read or checked by the means M, said charge can be replenished, if necessary, by and through the means F and excessive pressures that might be generated can be bled off through the means M.

The lanyard 88 extending from the housing of the means H, can be extended to and made accessible at a desired station remote from the apparatus.

When it is desired to open the construction, and initiate the flow of air from the cylinder C to the aspirator A, the person actuating the apparatus simply pulls on the available and accessible end of the lanyard. Pulling of the lanyard results in rotation of the wheel 77 to that position where the legs on the plunger are disengaged by the lugs on the wheel. When the plunger legs are thus disengaged, the unit U controlling the flow of air through the construction is free to be shifted forwardly by action of the spring 62 of the means G.

When the spring 62 urges the unit U forwardly, flow of air from the cylinder C through the inlet port 15, flow passage 45, chamber 46, and outlet port 16 is initiated. Initially, the spring 62 urges the unit U to its fully open and forward position and until the entire system, downstream of the valve seat 47 is pressurized to the desired extent and the pressure in the chamber 46 and acting upon the valve member 52 balances the force exerted by the spring 62. When the pressure in the chamber 46 exceeds the desired or set pressure, the valve member and the unit U of which it is a part, is urged rearwardly towards the seat and against the resistance of the spring 62 towards its closed position and in such a manner as to restrict the flow of air into the chamber 46 and to maintain the desired, balance, pressure in the chamber and throughout the system, downstream of the valve seat.

After the construction has been operated in the above manner, it will be apparent that the construction can be reset and the apparatus recharged easily and quickly without the exercise of any particular skill and without the use of special equipment.

Having described only typical preferred form and application of our invention, we do not wish to be limited or restricted to the specific details herein set forth, but wish to reverse to ourselves any modifications or variations that may appear to those skilled in the art and which fall within the scope of the following claims:

Having described our invention, we claim:

1. A valve structure of the character referred to including, an elongate body with front and rear ends, an elongate longitudinal flow passage with a forwardly disposed annular valve seat at its forward end in the body between the ends thereof, an enlarged flow chamber in the body communicating with the forward end of the flow passage and the seat, a plunger bore entering the front end of the body and communicating with the flow chamber, a socket entering the rear end of the body, a piston bore between and communicating with the socket and the flow passage, an inlet port in the body communicating with the rear portion of the flow passage and an outlet port in the body communicating with the flow chamber, an elongate valving unit including an elongate coupler extending longitudinally and freely through the flow passage, an elongate enlarged valve member on the front end of the coupler in the flow chamber and normally engaging the valve seat, an elongate enlarged piston head on the rear end of the coupler and engaged in the piston bore, an elongate plunger slidably engaged in the plunger bore, manually operable release means carried by the body at the front end thereof and normally releasably holding the plunger in engagement with the front end of the valve member and holding said member seated on the valve seat and resilient actuating means in the socket normally yieldingly urging the unit forwardly.

2. A structure as set forth in claim 1 wherein said actuating means includes an elongate, longitudinally extending compression spring in the socket and engaging the rear end of the piston and a cup threadedly engaged in the socket rearward of and engaging the spring.

3. A structure as set forth in claim 1 wherein said manually operable release means includes circumferentially spaced legs projecting forwardly from the plunger, circumferentially spaced stop lugs supported from the body for free rotation and normally engaging the front ends of the legs and shiftable circumferentially from engagement therewith, and manually engageable means coupled with said legs to selectively rotate them from engagement with the lugs.

4. A structure as set forth in claim 1 wherein said actuating means includes an elongate, longitudinally extending compression spring in the socket and engaging the rear end of the piston and a cup threadedly engaged in the socket rearward of and engaging the spring, said manually operable release means includes circumferentially spaced legs projecting forwardly from the plunger, circumferentially spaced stop lugs supported from the body for free rotation and normally engaging the front ends of the legs and shiftable circumferentially from engagement therewith, and manually engageable means coupled with said lugs to selectively rotate them from engagement with the legs.

5. A structure as set forth in claim 1 wherein said actuating means includes an elongate, longitudinally extending compression spring in the socket and engaging the rear end of the piston and a cup threadedly engaged in the socket rearward of and engaging the spring, said manually operable release means includes circumferentially spaced legs projecting forwardly from the plunger, circumferentially spaced stop lugs supported from the body for free rotation and normally engaging the front ends of the legs and shiftable circumferentially from engagement therewith, and manually engageable means coupled with said lugs to selectively rotate them from engagement with the legs, said manually operable release means including a carrier plate fixed to the front end of the body and having a central threaded sleeve and circumferentially spaced apertures, circumferentially spaced legs on the plunger and projecting forwardly through the apertures, an elongate shaft threaded into and projecting forwardly from the sleeve and having an enlarged head at its forward end, a wheel rotatably carried by the shaft and having circumferentially spaced, rearwardly projecting lugs normally engaged with the ends of the legs and holding the plunger and the unit rearward in the body, spring means between the head on the shaft and the wheel normally yieldingly urging the wheel rearwardly and an elongate lanyard with one end fixed to and engaged about the wheel and having a manually engageable free end adapted to be engaged and pulled to rotate the wheel and shift the lugs out of engagement with the legs.

6. A structure as set forth in claim 1 and further including charging means to charge and pressurize the structure and a related pressure system upstream of the valve seat and including, an outwardly opening charging passage in the body communicating with the inlet port and an inlet check valve engaged in the charging passage and accessible at the exterior of the body.

7. A structure as set forth in claim 1 and further including pressure relief means to relieve excess pressure in the body upstream of the valve seat and including an outwardly opening pressure relief passage in the body communicating with the inlet port and a spring-loaded outlet check valve engaged in the relief passage.

8. A structure as set forth in claim 1 and further including charging means to charge and pressurize the structure and a related pressure system upstream of the valve seat and including, an outwardly opening charging passage in the body communicating with the inlet port and an inlet check valve engaged in the charging passage and accessible at the exterior of the body, said pressure relief means to relieve excess pressure in the body upstream of the valve seat and including an outwardly opening pressure relief passage in the body communicating with the inlet port and a spring-loaded outlet check valve engaged in the relief passage.

9. A structure as set forth in claim 1 wherein said actuating means includes an elongate, longitudinally extending compression spring in the socket and engaging the rear end of the piston and a follower threadedly engaged in the socket rearward of and engaging the spring, said manually operable release means includes circumferentially spaced legs projecting forwardly from the plunger, circumferentially spaced stop lugs supported from the body for free rotation and manually engaging the front ends of the legs and shiftable circumferentially from engagement therewith, and manually engageable means coupled with said legs to selectively rotate them from engagement with the legs, said manually operable release means including a carrier plate fixed to the front end of the body and having a central threaded sleeve and circumferentially spaced apertures, circumferentially spaced legs on the plunger and projecting forwardly through the apertures, an elongate shaft threaded into and projecting forwardly from the sleeve and having an enlarged head at its forward end, a wheel rotatably carried by the shaft and having circumferentially spaced, rearwardly projecting lugs normally engaged with the ends of the legs and holding the plunger and the unit rearward in the body, spring means between the head on the shaft and the wheel normally yieldingly urging the wheel rearwardly and an elongate lanyard with one end fixed to and engaged about the wheel and having a manually engageable free end adapted to be engaged and pulled to rotate the wheel and shift the lugs out of engagement with the legs, said inlet port entering one side of the body and having an enlarged socket at its outer end, said charging and relief passage entering the other side of the body extending by opposite sides of the flow passage and communicating with the bottom of the socket in the inlet port.

10. A structure as set forth in claim 1 wherein said actuating means includes an elongate, longitudinally extending compression spring in the socket and engaging the rear end of the piston and a follower threadedly engaged in the socket rearward of and engaging the spring, said manually operable release means includes circumferentially spaced legs projecting forwardly from the plunger, circumferentially spaced stop lugs supported from the body for free rotation and normally engaging the front ends of the legs and shiftable circumferentially from engagement therewith, and manually engageable means coupled with the legs to selectively rotate them from engagement with the legs, said manually operable release means including a carrier plate fixed to the front end of the body and having a central threaded sleeve and circumferentially spaced apertures, circumferentially spaced legs on the plunger and projecting forwardly through the apertures, an elongate shaft threaded into and projecting forwardly from the sleeve and having an enlarged head at its forward end, a wheel rotatably carried by the shaft and having circumferentially spaced, rearwardly projecting lugs normally engaged with the ends of the legs and holding the plunger and the unit rearward in the body, spring means between the head on the shaft and the wheel normally yieldingly urging the wheel rearwardly and an elongate lanyard with one end fixed to and engaged about the wheel and having a manually engageable free end adapted to be engaged and pulled to rotate the wheel and shift the lugs out of engagement with the legs, and pressure indicating means to indicate the pressure in the structure upstream of the valve seat and including a pressure passage entering the rear end of the body and communicating with the inlet port and a pressure gauge engaged in the rear end of said pressure passage.

References Cited

UNITED STATES PATENTS

| 2,825,358 | 3/1958 | Niles | 137—505.18 |
| 2,895,640 | 7/1959 | Becker et al. | 137—495 XR |
| 3,259,144 | 7/1966 | Taplin | 137—557 XR |

FOREIGN PATENTS

| 5,277 | 4/1890 | Great Britain. |
| 563,791 | 9/1958 | Canada. |

HENRY T. KLINKSIEK, *Primary Examiner.*